(12) United States Patent
Park et al.

(10) Patent No.: US 10,173,571 B2
(45) Date of Patent: Jan. 8, 2019

(54) COOLING AND HEATING APPARATUS FOR VEHICLE CUP HOLDER

(71) Applicants: Hyundai Motor Company, Seoul (KR); Kia Motors Corporation, Seoul (KR)

(72) Inventors: Jae Woo Park, Gyeonggi-do (KR); Jae Woong Kim, Gyeonggi-do (KR); Man Ju Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 349 days.

(21) Appl. No.: 15/000,144

(22) Filed: Jan. 19, 2016

(65) Prior Publication Data
US 2016/0339822 A1 Nov. 24, 2016

(30) Foreign Application Priority Data
May 18, 2015 (KR) .................. 10-2015-0068616

(51) Int. Cl.
*F25B 21/00* (2006.01)
*B60N 3/10* (2006.01)
*F25B 21/04* (2006.01)

(52) U.S. Cl.
CPC ............. *B60N 3/104* (2013.01); *F25B 21/04* (2013.01); *F25B 2321/02* (2013.01); *F25B 2321/0212* (2013.01); *F25B 2321/0251* (2013.01)

(58) Field of Classification Search
CPC .. F25B 21/02; F25B 49/00; F25B 2321/0212; F25B 2321/0251; F25D 11/00; B60N 3/104; A47G 23/02

USPC ..................... 62/3.2, 3.6, 3.61, 3.7
See application file for complete search history.

(56) References Cited

U.S. PATENT DOCUMENTS

| | | | | |
|---|---|---|---|---|
| 2008/0163916 A1* | 7/2008 | Tsuneoka | ............. | H01L 35/32 136/203 |
| 2009/0038317 A1* | 2/2009 | Otey | .............. | F25B 21/04 62/3.2 |
| 2012/0102972 A1* | 5/2012 | Al-Qaffas | ............. | F25B 21/04 62/3.6 |

FOREIGN PATENT DOCUMENTS

| | | |
|---|---|---|
| JP | 2015-058837 A | 3/2015 |
| KR | 1998-051298 U | 10/1998 |
| KR | 10-2006-0114593 A | 11/2006 |
| KR | 10-2009-0115418 A | 11/2009 |
| KR | 2013-0019148 A | 2/2013 |
| KR | 2013-0143338 A | 12/2013 |

* cited by examiner

*Primary Examiner* — Melvin Jones
(74) *Attorney, Agent, or Firm* — Mintz Levin Cohn Ferris Glovsky and Popeo, P.C.; Peter F. Corless

(57) ABSTRACT

A cooling and heating apparatus for a vehicle cup holder is provided that has an improved performance for cooling and heating a drink by directly cooling or heating the drink in the cup. The apparatus includes a cup having a thermoelectric module and a first electroconductive part on an outer surface thereof and a cup holder that has a heat dissipating member and a second electroconductive part. Additionally, a controller is connected to the thermoelectric module to realize an electrical closed circuit and is configured to adjust an amount of an electric current applied to the thermoelectric module based on a desired temperature to heat or cool a drink in the cup.

24 Claims, 6 Drawing Sheets

COOLING AND HEATING APPARATUS FOR VEHICLE CUP HOLDER

CROSS REFERENCE TO RELATED APPLICATION

The present application claims priority to Korean Patent Application No. 10-2015-0068616, filed on May 18, 2015, the entire contents of which is incorporated herein for all purposes by this reference.

BACKGROUND

Field of the Invention

The present invention relates to a vehicle cup holder and, more particularly to a cooling and heating apparatus for a vehicle cup holder that has an improved performance for cooling and heating a beverage by directly cooling or heating the beverage in the cup.

Description of the Related Art

Generally, a cooling and heating apparatus for a cup holder mounted within a vehicle provides a heating or cooling function to the cup holder. When the cup holder is operated in a heating mode, the surface of a cup within the cup holder is heated and the temperature thereof increases. When the temperature of the cooling and heating apparatus for a cup holder is not controlled, the cup holder may be excessively heated, thereby burning a user's hand or causing a beverage to boil and overflow from the cup. In addition, when the apparatus is operated in a cooling mode, half of the thermal energy of the cooled cup holder is wasted in cooling ambient air, thereby causing substantial energy loss, and causing difficulty in rapid cooling of the beverage due to excessive resistance caused by contact with ambient air.

Accordingly, a conventional heating apparatus has an additional temperature sensor attached to the cup holder, and requires an additional logic to control the conventional apparatus, thereby increasing working time and manufacturing cost. Additionally, the sensor of the conventional cup holder may malfunction, which negatively affects the durability and operational reliability of the cooling and heating apparatus for a cup holder.

The foregoing is intended merely to aid in the understanding of the background of the present invention, and is not intended to mean that the present invention falls within the purview of the related art that is already known to those skilled in the art.

SUMMARY

Accordingly, the present invention provides a cooling and heating apparatus for a vehicle cup holder that has an improved performance for cooling and heating a beverage by directly cooling or heating the beverage in the cup.

According to an aspect of the present invention, a cooling and heating apparatus for a vehicle cup holder may include: a cup including a thermoelectric module and a first electroconductive part on an outer surface thereof, the first electroconductive part being in an electroconductive state with the thermoelectric module; a cup holder including a heat dissipating member and a second electroconductive part, the heat dissipating member and the second electroconductive part being disposed at respective portions and when a cup is disposed in the cup holder, the heat dissipating member corresponds to the thermoelectric module, and the second electroconductive part corresponds to the first electroconductive part; and a controller connected to the thermoelectric module to realize an electrical closed circuit, the controller configured to adjust an amount of an electric current applied to the thermoelectric module based on a desired temperature to heat or cool a beverage in the cup.

In particular, the thermoelectric module may be disposed on a center of a lower surface of the cup; the first electroconductive part may be disposed along a circumference of the thermoelectric module; the heat dissipating member may be disposed on a lower surface of the cup holder; and the second electroconductive part may be disposed along a circumference of the heat dissipating member. The first electroconductive part may be exposed to an exterior along the circumference of the thermoelectric module; and the second electroconductive part may be exposed to the exterior along the circumference of the heat dissipating member to be grounded by being in contact with the first electroconductive part.

The cup may include an inner cup and an outer cup, the outer cup being combined with the inner cup to surround a predetermined portion of the inner cup, with a space provided between the inner cup and the outer cup. A first surface of the thermoelectric module may be fixed to a lower surface of the inner cup and the first surface of the thermoelectric module may be in contact with the lower surface of the inner cup and a second surface of the thermoelectric module may be exposed to the exterior.

The cooling and heating apparatus may further include a first elastic member configured to apply an elastic restoring force in a direction contrary to (e.g., opposite to) a direction in which the first electroconductive part moves toward the second electroconductive part when the first electroconductive part comes into contact with and presses the second electroconductive part. The first elastic member may be disposed between a lower surface of the second electroconductive part and an upper surface of the cup holder facing the lower surface of the second electroconductive part.

A magnetic body may be disposed on the lower surface of the cup facing the second electroconductive part. The first elastic member may be disposed between an upper surface of the first electroconductive part and the lower surface of the cup facing the upper surface of the first electroconductive part. A magnetic body may be disposed on an upper surface of the cup holder facing the first electroconductive part. An uppermost end of the heat dissipating member may be disposed at a position higher than an uppermost end of the second electroconductive part, and a lowest end of the first electroconductive part may be disposed at a position lower than a lower end of the thermoelectric module.

The cooling and heating apparatus may further include: a third electroconductive part disposed on the outer surface of the cup, the third electroconductive part being in an electroconductive state with the thermoelectric module; and a tongue assembly electrically connected to the controller and arranged at a portion that corresponds to the third electroconductive part when the cup is mounted in the cup holder allowing the tongue assembly to realize an electroconductive state between the controller and the third electroconductive part.

Additionally, the third electroconductive part may be disposed along an outer circumferential surface of the cup. The tongue assembly may include: a fourth electroconductive part, a first end of which is connected to the controller; and a second elastic member connected between an inner surface of the cup holder and the fourth electroconductive part, the second elastic member configured to apply an elastic force to the fourth electroconductive part to cause a second end of the fourth electroconductive part to move toward a center of the cup holder.

The first electroconductive part may be a wireless power receiver disposed along the circumference of the thermoelectric module, and the second electroconductive part may be a wireless power transmitter disposed along the circumference of the heat dissipating member providing a wireless connection between the second electroconductive part and the first electroconductive part. The cooling and heating apparatus may further include: a blower disposed at a portion to which heat of the heat dissipating member is dissipated and configured to cool the heat dissipating member.

The controller may include: an operating switch configured to determine whether to cool or heat the beverage. Additionally, when the operating switch is turned on, the controller may be configured to realize the electrical closed circuit with the thermoelectric module, execute application of the electric current to the thermoelectric module, and adjust a flow direction of the electric current based on a cooling mode or a heating mode. The operating switch may be configured to determine whether to cool or heat the beverage. Further, when the operating switch is turned on, the controller may be configured to realize the electrical closed circuit with the thermoelectric module and execute application of the electric current to the second electroconductive part. The controller may also include a direction control circuit disposed between the first electroconductive part and the thermoelectric module and configured to adjust the flow direction of the electric current based on the cooling mode or the heating mode.

When the cup holder enters the cooling mode with the cup mounted in the cup holder and the controller realizing the electrical closed circuit with the thermoelectric module, the controller may be configured to apply a cooling operation signal to the thermoelectric module, to cool a first surface of the thermoelectric module adjacent to the inner surface of the cup and heat a second surface of the thermoelectric module. Further, the controller may be configured to apply an operation signal to the blower. When the cup holder enters the heating mode with the cup mounted in the cup holder and the controller realizing the electrical closed circuit with the thermoelectric module, the controller may be configured to apply a heating operation signal to the thermoelectric module, to heat a first surface of the thermoelectric module adjacent to the inner surface of the cup and cool a second surface of the thermoelectric module.

The operating switch may be configured to select a desired temperature of the beverage, and the controller may be configured to adjust the temperature of the beverage by adjusting the amount of the electric current applied to the thermoelectric module based on the desired temperature of the beverage. The cooling and heating apparatus for the vehicle cup holder may further include: a temperature sensor configured to measure a temperature of the heat dissipating member. In particular, the controller may be configured to compare a measured value of the temperature sensor with a reference value estimated to correspond to the amount of the electric current applied to the thermoelectric module, and when the measured value exceeds the reference value, the controller may be configured to restrict the amount of the electric current applied to the thermoelectric module.

When the operating switch is turned off, or the controller realizes an electrical open circuit with the thermoelectric module after the controller applies the electric current to the thermoelectric module while realizing the electrical closed circuit with the thermoelectric module with the operating switch turned on, an operation of the blower may be stopped after the blower is operated for a predetermined time. Alternatively, when the operating switch is turned off, or the controller realizes an electrical open circuit with the thermoelectric module after the controller applies the electric current to the thermoelectric module while realizing the electrical closed circuit with the thermoelectric module with the operating switch turned on, an operation of the blower may be stopped after the blower is operated until the temperature of the heat dissipating member reaches a reference temperature.

When the cup holder enters the heating mode with the cup mounted in the cup holder and the controller realizing the electrical closed circuit with the thermoelectric module during an operation of the blower with the operating switch turned off, or with the controller realizing the electrical open circuit with the thermoelectric module, the operation of the blower may be stopped. Additionally, in the cooling and heating apparatus, a lamp may be connected to the controller operate the lamp based on whether the cup holder is being operated.

According to another aspect of the present invention, a cup for a cup holder, may include: a thermoelectric module and an electroconductive part disposed on an outer surface of the cup, the electroconductive part being in an electroconductive state with the thermoelectric module.

The cooling and heating apparatus for the vehicle cup holder of the present invention directly heats or cools a beverage in the cup using the thermal energy transferred from a thermoelectric module, thereby rapidly heating or cooling the beverage. Particularly, when the cup holder is operated in the heating mode, the danger that the cup holder may be overheated is eliminated, and thus the apparatus may safely heat the beverage to a higher temperature. Additionally, when the cup holder is operated in the cooling mode, the amount of the thermal energy that may be wasted to the exterior is minimized, and thus the apparatus has an improved performance for cooling a beverage.

In addition, when the cup holder enters the cooling mode or the heating mode with the controller realizing an electrical closed circuit with the thermoelectric module, the controller may be configured to execute the application of the electric current to the thermoelectric module, and further, prevent the second electroconductive part disposed at a portion of the cup holder from being grounded by other conductive materials except for the cup, thereby preventing safety accidents that may be caused during the cooling or heating operation of the cup holder.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinbelow, exemplary embodiments of the present invention will be described in detail with reference to the accompanying drawings. Throughout the drawings, the same reference numerals will refer to the same or like parts.

A cooling and heating apparatus for a vehicle cup holder of the present invention may include a cup 100, a cup holder 200, and a controller, and may have the configuration of a first exemplary embodiment realizing an electrical connection in a wire mode, and the configuration of a second exemplary embodiment realizing an electrical connection in a wireless mode.

Figure 1:
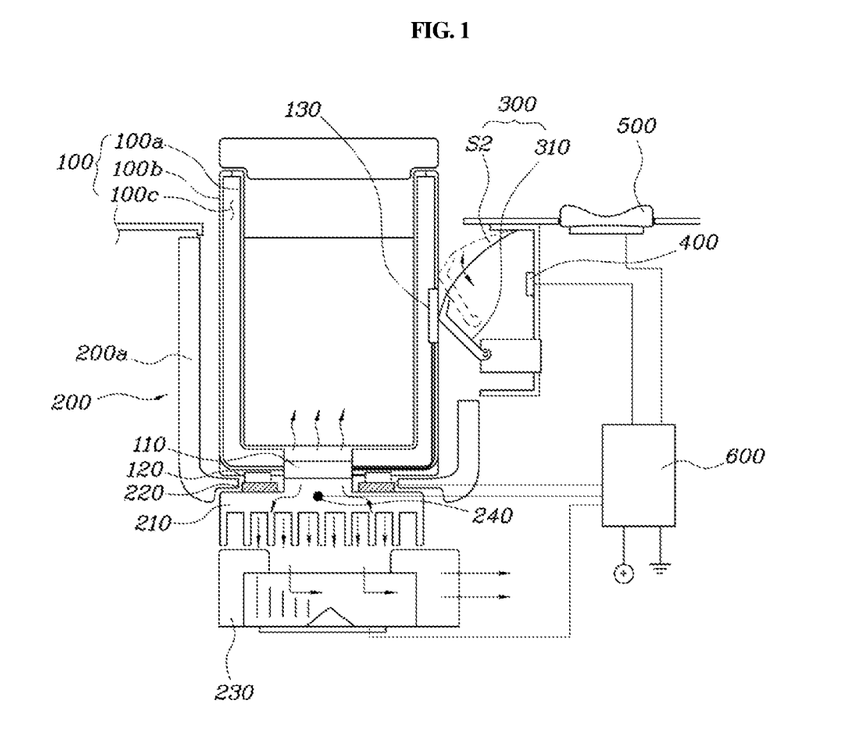
FIG. 1 is a view showing an entire structure of a cooling and heating apparatus for a vehicle cup holder according to an exemplary embodiment of the present invention.
Figure 2:
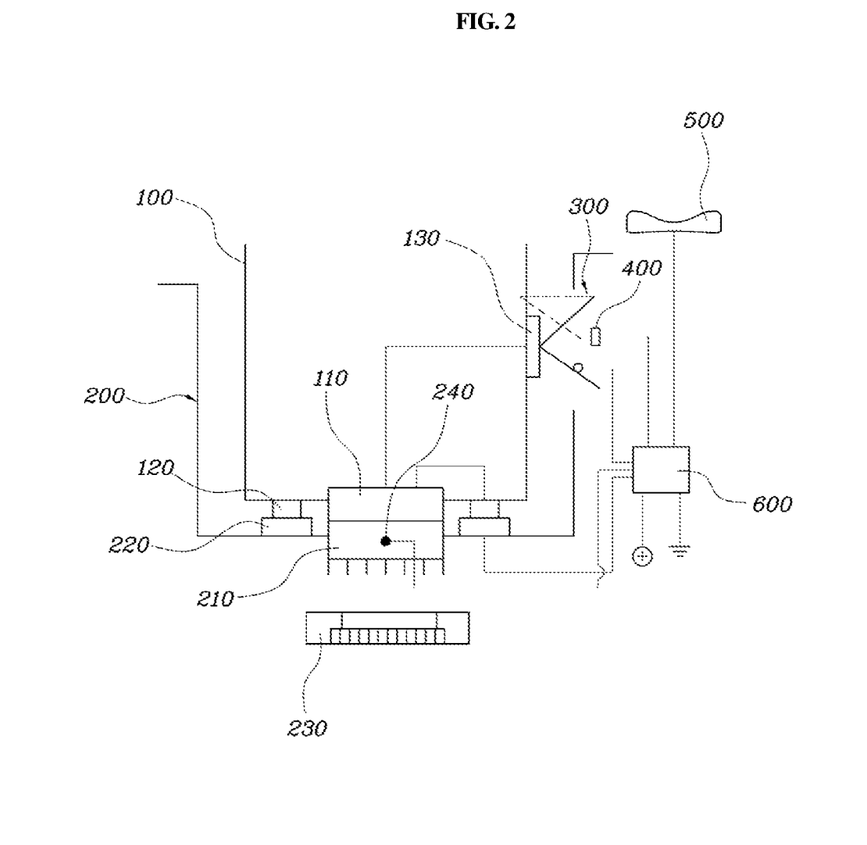
FIG. 2 is a view showing an electrical connection flow in the configuration of a first exemplary embodiment of the cooling and heating apparatus for the vehicle cup holder according to an exemplary embodiment of the present invention.

First, the configuration of the first exemplary embodiment will be described. Referring to FIGS. 1 and 2, the cup 100 may be mounted in the cup holder 200, and the cup 100 may include a thermoelectric module 110, and a first electroconductive part 120 on an outer surface thereof, the first electroconductive part 120 being in an electroconductive state with the thermoelectric module 110. In particular, the first electroconductive part 120 may be an electrical terminal grounded by contact with the thermoelectric module 110.

Further, the thermoelectric module 110 may be disposed on a substantial center of a lower surface of the cup 100, and the first electroconductive part 120 may be disposed on the lower surface of the cup 100 along a circumference of the thermoelectric module 110. Additionally, the cup 100 may include the inner cup 100a and the outer cup 100b, the outer cup 100b being combined with the inner cup 100a, and in this case, a space 100c may be provided between the inner cup 100a and the outer cup 100b for insulation.

In addition, a first surface of the thermoelectric module 110 may be fixed to a lower surface of the inner cup 100a to allow the first surface of the thermoelectric module 110 to be in contact with the lower surface of the inner cup 100a and thus, the thermoelectric module 110 and the inner cup 100a may be in a thermally grounded state with each other, and a second surface of the thermoelectric module 110 may be exposed to the outside and thus, the second surface of the thermoelectric module 110 may be in the thermally grounded state with a heat dissipating member 210 to be mentioned hereinafter when the thermoelectric module 110 comes into contact with the heat dissipating member 210.

Furthermore, the cup holder 200 may include a space therein to house (e.g., receive) the cup 100, with an opening at an upper end of the cup holder 200. When the cup 100 is mounted in the cup holder 200, the heat dissipating member 210 may be disposed at a portion of the cup holder 200 that corresponds to the thermoelectric module 110, and a second electroconductive part 220 may be disposed at a portion of the cup holder 200 that corresponds to the first electroconductive part 120. Particularly, the second electroconductive part 220 may be an electrical terminal grounded by contact with the first electroconductive part 120. In addition, the cup holder 200 may include a cup holder housing 200a combined with a body of the cup holder 200, the cup holder housing 200a being configured to house or receive the cup 100. The cup holder housing 200a may include an aperture at a center of a bottom surface thereof, and an upper end of the heat dissipating member 210 may be provided to protrude through the aperture of the cup holder housing 200a.

In addition, the second electroconductive part 220 may be disposed along a circumference of the heat dissipating member 210 to come into contact with the first electroconductive part 120. The controller is provided to realize an electrical closed circuit with the thermoelectric module 110, and the controller may be configured to adjust an electric current applied to the thermoelectric module 110 based on a desired temperature to heat or cool the beverage in the cup 100. For example, the controller 600 may include an operating switch 500 configured to determine whether to cool or heat the beverage, and when the operating switch 500 is turned on, the controller 600 may realize the electrical closed circuit with the thermoelectric module 110, apply the electric current to the thermoelectric module 110, and adjust a flow direction of the electric current based on a cooling mode or a heating mode. In particular, the controller 600 may be provided with a direction control circuit 140 configured to adjust the flow direction of the electric current.

In other words, according to the configuration described above, when the cup 100 is mounted in the cup holder 200, the thermoelectric module 110 disposed on the lower surface of the cup 100 comes into contact with the heat dissipating member 210 to produce an electroconductive state therebetween, and the first electroconductive part 120 disposed on the lower surface of the cup 100 comes into contact with the second electroconductive part 220, the first electroconductive part 120 being in an electroconductive state with the second electroconductive part 220, thus the controller 600 and the thermoelectric module 110 realize an electrical closed circuit therebetween.

Particularly, the controller 600 may be configured to determine whether to operate the cup holder 200 in the cooling mode or in the heating mode based on the desired temperature (e.g., user defined or selected temperature) of a beverage, and a polarity (e.g., positive or negative) of the thermoelectric module 110 may be switched by the direction control circuit 140 based on the selected mode, and thus the inner surface of the cup 100 may be heated or cooled based on the set polarity.

Accordingly, the cooling and heating apparatus for the vehicle cup holder of the present invention may heat or cool the beverage of the cup 100 using the thermal energy directly transferred to the cup 100 from the thermoelectric module 110, thereby rapidly heating or cooling the beverage. Particularly, when the cup holder 200 is operated in the heating mode, the danger that the cup holder 200 may be overheated is eliminated, and thus the apparatus may safely heat the beverage to a higher temperature, whereas when the cup holder 200 is operated in the cooling mode, the amount of the thermal energy that may be wasted to the exterior may be minimized, and thus the apparatus has an improved performance for cooling a beverage.

Furthermore, the cooling and heating apparatus for the vehicle cup holder of the present invention may include a blower 230 disposed at a portion to which heat of the heat dissipating member 210 is dissipated and thus, blower may be configured to cool the heat dissipating member. In particular, the lower end of the heat dissipating member 210 may be configured in shapes of a plurality of pins, and thus heat dissipation may be efficiently realized, and the blower 230 may be disposed under the heat dissipating member 210 to dissipate the heat from the heat dissipating member 210. In other words, when the cup holder 200 is operated in the cooling mode, the heat generated at a lower surface of the thermoelectric module 110 may be rapidly dissipated through pins of the heat dissipating member 210 to the exterior, and thus a temperature of an upper surface of the thermoelectric module 110 that comes into contact with the inner cup 100a may be reduced, thus improving the performance for cooling the beverage.

Figure 3:
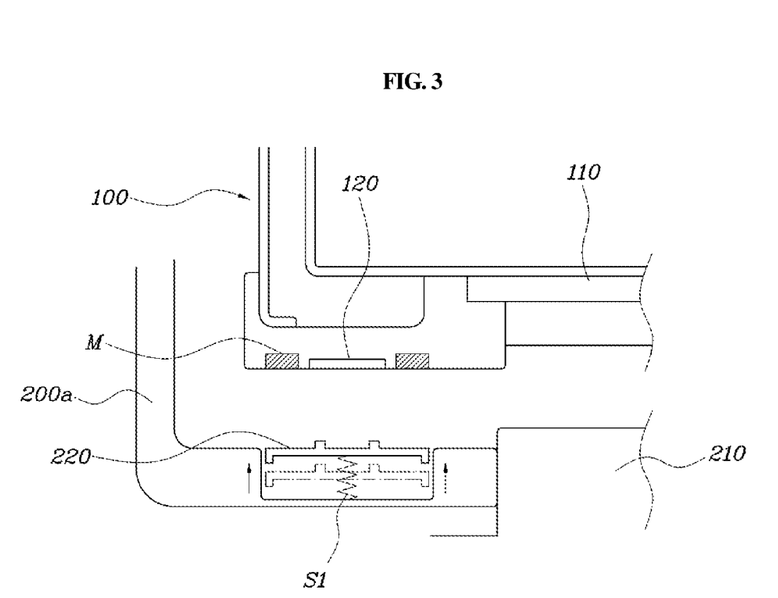
FIG. 3 is a view showing an electroconductive configuration between a cup and the cup holder in the configuration of the first exemplary embodiment of the present invention.

Meanwhile, the cooling and heating apparatus for the vehicle cup holder of the present invention may further include a first elastic member S1 configured to apply elastic restoring forces in a direction contrary to a direction in which the first electroconductive part 120 moves toward the second electroconductive part 220 when the first electroconductive part 120 comes into contact with and press the second electroconductive part 220. Referring to FIG. 3, the second electroconductive part 220 may be disposed on the bottom surface of the cup holder housing 200a in a circumferential direction along a circumference of the heat dissipating member 210. The first elastic member S1 may be disposed between a lower surface of the second electroconductive part 220 and the bottom surface of the cup holder housing 200a, and thus the second electroconductive part 220 may elastically move in a vertical direction within the scope of an elastic force of the first elastic member S1. Particularly, the first elastic member S1 may be a compression spring.

In addition, a magnetic body M may be disposed at the lower surface of the cup 100 facing the second electroconductive part 220. Further, the magnetic body M may be permanent magnets, and a magnetic force of the magnetic body M moves the second electroconductive part 220 to the first electroconductive part 120 to improve contact between the first electroconductive part 120 and the second electroconductive part 220.

Figure 4:
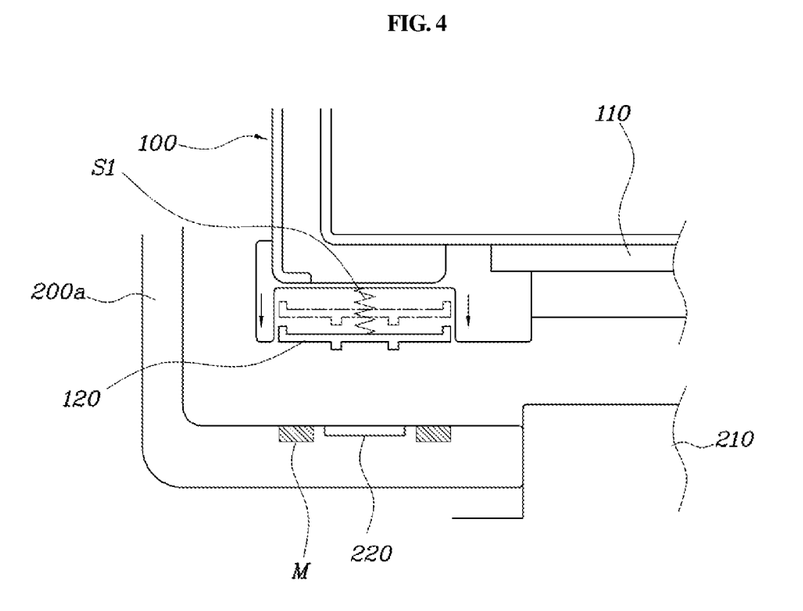
FIG. 4 is a view showing another electroconductive configuration between the cup and the cup holder in the configuration of the first exemplary embodiment of the present invention.

Referring to FIG. 4, the first electroconductive part 120 may be disposed below the lower surface of the cup 100 in a circumferential direction along the circumference of the thermoelectric module 110. The first elastic member S1 may be disposed between an upper surface of the first electroconductive part 120 and the lower surface of the cup 100, and thus, the first electroconductive part 120 may elastically move in a vertical direction within the scope of an elastic force of the first elastic member S1. In particular, the first elastic member S1 may be a compression spring.

In addition, the magnetic body M may be disposed at an upper surface of the cup holder 200 facing the first electroconductive part 120. Further, the magnetic body M may be permanent magnets, and a magnetic force of the magnetic body M moves the first electroconductive part 120 to the second electroconductive part 220 to improve contact between the first electroconductive part 120 and the second electroconductive part 220.

In other words, when the cup 100 is mounted in the cup holder 200, the first electroconductive part 120 disposed on the lower surface of the cup 100 may be in a ground state with the second electroconductive part 220. When the first elastic member S1 is compressed by a weight of the cup 100, the cup 100 may be further lowered into the cup holder, and the first electroconductive part 120 may be in a ground state with the second electroconductive part 220, and the lower surface of the thermoelectric module 110 may be in a ground state with an upper surface of the heat dissipating member 210. Accordingly, a thermally grounded state may be realized between the lower surface of the thermoelectric module 110 and the upper surface of the heat dissipating member 210, and thus, the thermal energy transferred from the thermoelectric module 110 may be dissipated through the heat dissipating member 210.

Furthermore, referring to FIGS. 1 and 2, according to the cooling and heating apparatus for the vehicle cup holder of the present invention, an uppermost end of the heat dissipating member 210 may be disposed at a position higher than uppermost ends of the second electroconductive part 220. Additionally, lowest ends of the first electroconductive part 120 may be disposed at positions lower than a lower end of the thermoelectric module 110. In other words, by protruding a height of the heat dissipating member 210 in an upward direction higher than a height of the second electroconductive part 220, even though another conductive material is mounted in the cup holder 200, the conductive material comes into contact merely with the upper surface of the heat dissipating member 210, thereby preventing the risk of a safety accident that may be caused by the ground state that may be realized between the conductive material and the second electroconductive part 220.

The cooling and heating apparatus for the vehicle cup holder of the present invention may further include a third electroconductive part 130 and a tongue assembly 300. Referring to FIGS. 1 and 2, the third electroconductive part 130 may be disposed on the outer surface of the cup 100 with the third electroconductive part 130 being in an electroconductive state with the thermoelectric module 110. For example, the third electroconductive part 130 may be disposed along outer circumferential surface of the cup 100.

Additionally, the tongue assembly 300 may be arranged at a portion that corresponds to the third electroconductive part 130, the tongue assembly 300 being electrically connected to the controller, and thus, when the cup 100 is mounted in the cup holder 200, an electroconductive state between the third electroconductive part 130 and the controller may be realized. The tongue assembly 300 may include a fourth electroconductive part 310 and a second elastic member S2, and a first end of the fourth electroconductive part 310 may be connected to the controller 600. In particular, the third electroconductive part 130 and the fourth electroconductive part 310 may be terminals electrically connected by contact with each other.

The second elastic member S2 may be connected between the inner surface of the cup holder 200 and the fourth electroconductive part 310. Further, the second elastic member S2 may be configured to apply an elastic force to the fourth electroconductive part 310 and thus, a second end of the fourth electroconductive part 310 may move toward a center of the cup holder 200. For example, the second elastic member S2 may be provided as a plate spring, and a first end of the second elastic member S2 may be fixed to an inner surface of the cup holder housing 200a, and a second end of the second elastic member S2 may be fixed to the second end of the fourth electroconductive part 310.

In other words, the second end of the fourth electroconductive part 310 may be configured to be moved toward the center of the cup holder 200 by an elastic force applied from the second elastic member S2. Accordingly, when the cup 100 is mounted in the cup holder 200, the second end of the fourth electroconductive part 310 may remain in contact with the outer surface of the cup 100. Accordingly, when the cup 100 is mounted in the cup holder 200, the third electroconductive part 130 provided on the outer surface of the cup 100 is in an electroconductive state with the fourth electroconductive part 310, and the thermoelectric module 110 and the controller are in electrical connection.

Figure 5:
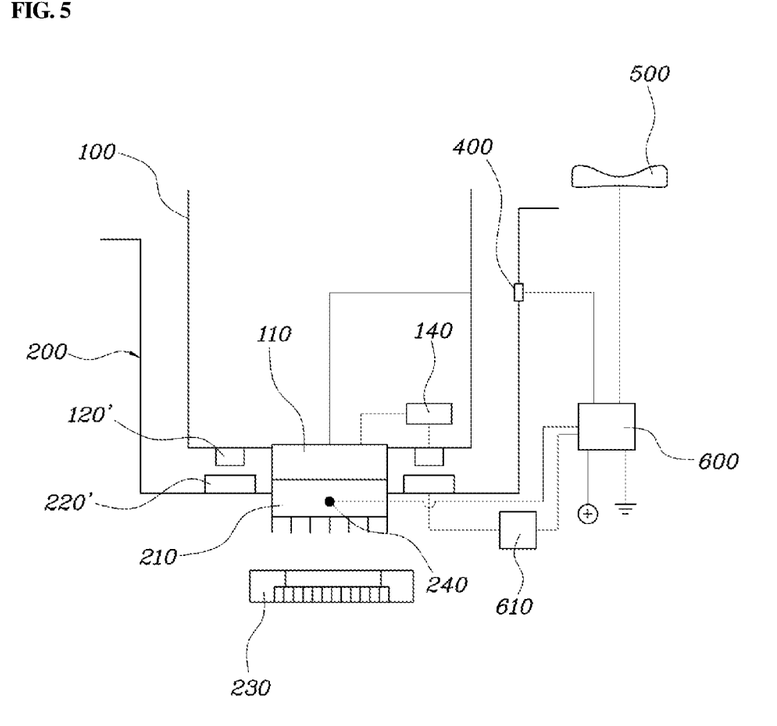
FIG. 5 is a view showing electrical connection flow in the configuration of a second exemplary embodiment of a cooling and heating apparatus for a vehicle cup holder according to an exemplary embodiment of the present invention.

Next, a configuration of a second exemplary embodiment of the cooling and heating apparatus for a vehicle cup holder according to the present invention will be described. Referring to FIG. 5, a thermoelectric module 110 may be disposed at a center of a lower surface of the cup 100, and the first electroconductive part 120' may be disposed along a circumference of the thermoelectric module 110. In particular, the first electroconductive part 120' may be a wireless power receiver that may be configured o wirelessly receive electricity.

In addition, the cup holder 200 may include a cup holder housing 200a combined with a body of the cup holder 200. The cup holder housing 200a may include an aperture at a center of a bottom surface thereof, and an upper end of the heat dissipating member 210 may be provided to protrude through the aperture of the cup holder housing 200a. Furthermore, the second electroconductive part 220' may be disposed along a circumference of the heat dissipating member 210, and thus the second electroconductive part 220' may be electrically connected to the first electroconductive part 120'. Particularly, the second electroconductive part 220' may be a wireless power transmitter disposed along the circumference of the heat dissipating member 210 and thus, the second electroconductive part 220' may be configured to wirelessly transmit electricity to the first electroconductive part 120'.

In other words, the wireless power transmitter, configured to wirelessly transmit and receive electrical power, may include wireless connection methods such as a magnetic induction method using induced current and coils, and a magnetic resonance method. The controller may be connected to the thermoelectric module 110 to realize the electrical closed circuit with the thermoelectric module 110, and the controller may be configured to adjust the electric current applied to the thermoelectric module 110 based on the temperature desired to heat or cool the beverage in the cup 100.

For example, the controller may include: the operating switch 500 configured to determine whether to cool or heat the beverage and when the operating switch 500 is turned on, the controller 600 may be configured to realize the electrical closed circuit with the thermoelectric module 110, and execute application of the electric current to the second electroconductive part 220'. Additionally, the direction control circuit 140 disposed between the first electroconductive part 120' and the thermoelectric module 110 may be configured to adjust the flow direction of the electric current based on the cooling mode or the heating mode.

In other words, according to the present invention having the above-mentioned configuration, when the cup 100 is mounted in the cup holder 200, the thermoelectric module 110 disposed at the center of the lower surface of the cup 100 comes into contact with the heat dissipating member 210, to create an electroconductive state therebetween. And the second electroconductive part 220' and the first electroconductive part 120' may be wirelessly connected to each other, and thus the electric current may be applied to the first electroconductive part 120' through the second electroconductive part 220', and an electrical closed circuit may be realized between the controller 600 and the thermoelectric module 110.

The controller 600 may be configured to determine whether to operate the cup holder 200 in the cooling mode or in the heating mode based on the desired temperature of a beverage, and the polarity (positive or negative) of the thermoelectric module 110 may be switched by the direction control circuit 140 based on the selected mode, and thus the inner surface of the cup 100 may be heated or cooled based on the set polarity. For example, when a digital signal manipulated by the operating switch 500 is input to the controller 600, the digital signal generated in the controller 600 may be changed into an analog signal by a converter 610 and the analog signal may be transmitted to the second electroconductive part 220'. Then, when the analog signal from the second electroconductive part 220' is wirelessly transmitted to the first electroconductive part 120', the direction control circuit 140 may be configured to adjust or change the flow direction of the electric current to the polarity set to match the analog signal, and apply the electric current to the thermoelectric module 110, and thereby each surface of the thermoelectric module 110 either dissipates or absorbs heat based on the set polarity.

Accordingly, since the beverage of the cup 100 may be heated or cooled using the thermal energy directly transferred to the cup 100 from the thermoelectric module 110, the temperature of the beverage may be rapidly heated or cooled. Particularly, when the cup holder 200 is operated in the heating mode, it may be possible to safely heat the beverage to a higher temperature without danger that the beverage may be overheated, and when the cup holder 200 is operated in the cooling mode, the amount of the thermal energy wasted to the exterior may be minimized, thereby improving the performance for cooling the beverage.

Meanwhile, as described above, when the operating switch 500 is turned on, the controller 600 of the present invention may be configured to apply the electric current to the thermoelectric module 110 while realizing the electrical closed circuit with the thermoelectric module 110, and the controller 600 may be configured to adjust the flow direction of the electric current based on the cooling mode or the heating mode.

Figure 6:
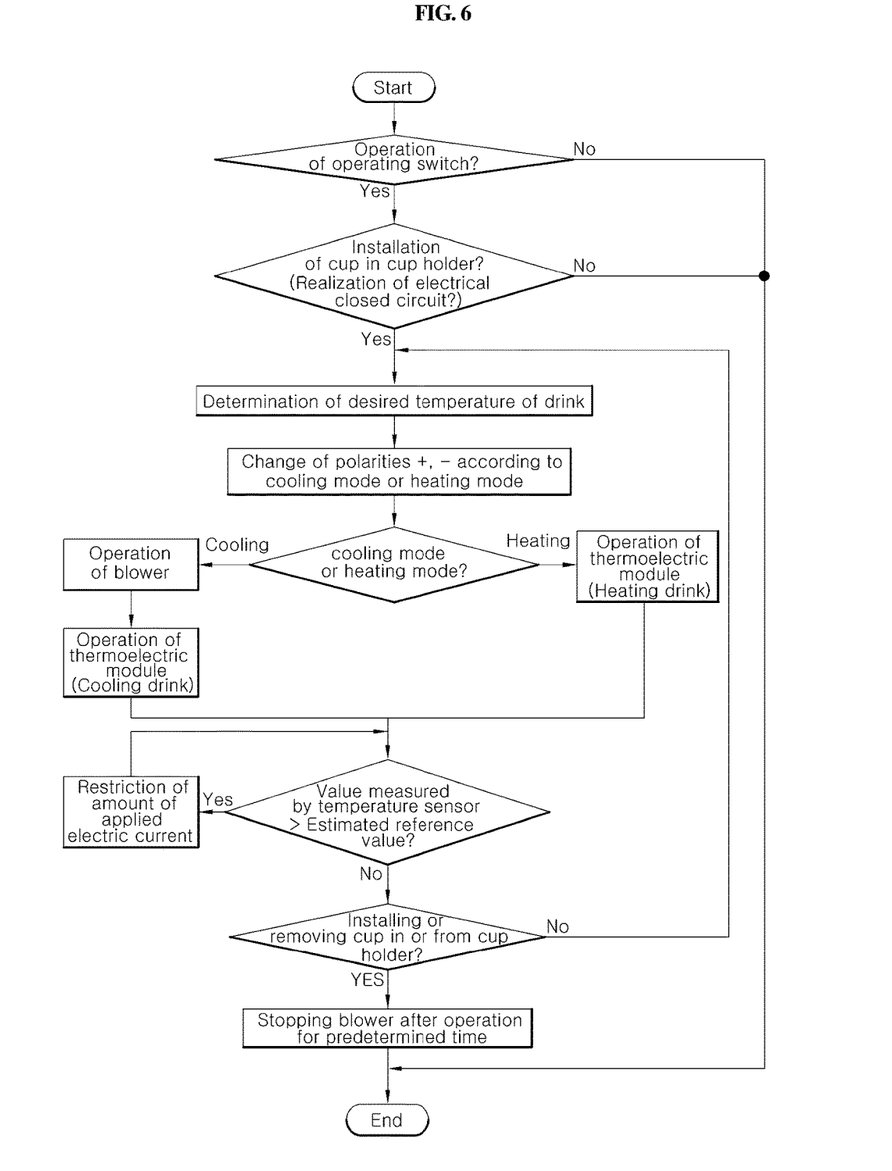
FIG. 6 is a flowchart showing a control process during the operation of the cooling and heating apparatus for the vehicle cup holder according to an exemplary embodiment of the present invention.

Referring to FIG. 6, described is a control process during the operation of the cooling and heating apparatus for a cup holder of the present invention. When the cup 100 is mounted in the cup holder 200, it may be determined whether the controller 600 realizes the electrical closed circuit with the thermoelectric module 110, and whether to cool or heat the beverage with the manipulation of the operating switch 500 based on the desired temperature of the beverage.

In other words, in the case of the first exemplary embodiment, when the first electroconductive part 120 is in the ground state with the second electroconductive part 220, and the third electroconductive part 130 is in the ground state with the fourth electroconductive part 310, whether an electrical closed circuit is realized between the controller 600 and the thermoelectric module 110 may be determined. In addition, in the case of the second exemplary embodiment, when the first electroconductive part 120' and the second electroconductive part 220' are located within a distance in which wireless transmission and reception are available therebetween with the cup 100 mounted in the cup holder 200, whether an electrical closed circuit is realized between the controller 600 and the thermoelectric module 110 may be determined.

In response to determining that with an electrical closed circuit established, the cup holder 200 may enter the cooling mode, the cooling operation signal may be applied to the thermoelectric module 110, and thus the first surface of the thermoelectric module 110 adjacent to the inner surface of the cup 100 may be cooled and the second surface of the thermoelectric module 110 may be heated. Additionally, the operational signal may be applied to the blower 230, and the heat dissipating member 210 may be cooled by the blower 230. Additionally, in response to determining that with an electrical closed circuit established, the cup holder 200 may enter the heating mode, the heating operation signal may be applied to the thermoelectric module 110, and thus the first surface of the thermoelectric module 110 adjacent to the inner surface of the cup 100 may be heated and the second surface of the thermoelectric module 110 may be cooled.

When the cup holder 200 is operated in a cooling mode by the operating switch 500, the upper surface of the thermoelectric module 110 disposed on the lower surface of the cup 100 may be cooled by the set polarity, and the lower surface of the thermoelectric module 110 that comes into contact with the heat dissipating member 210 and faces the heat dissipating member 210 may be heated. In particular, the lower surface of the thermoelectric module 110 comes into contact with the heat dissipating member 210, and the thermal energy of the lower surface of the thermoelectric module 110 is transferred to the heating dissipating member 210, and thus the heat dissipating member 210 may be cooled by operating the blower 230, which decreases the temperature of the upper surface of the thermoelectric module 110 and improves the performance for cooling the beverage.

In addition, when the cup holder 200 is operated in a heating mode by the operating switch 500, the upper surface of the thermoelectric module 110 contacting the lower surface of the cup 100 may be heated by the polarity set contrary to the cooling mode, and the lower surface of the thermoelectric module 110 that comes into contact with the heat dissipating member 210 and faces the heat dissipating member 210 may be cooled. In particular, the lower surface of the thermoelectric module 110 comes into contact with the heat dissipating member 210, and the thermal energy of the lower surface of the thermoelectric module 110 is transferred to the heating dissipating member 210, and thus the heat dissipating member 210 may be configured to absorb the thermal energy, which increases the temperature of the upper surface of the thermoelectric module 110 and improves the performance for heating the beverage.

Furthermore, the operating switch 500 of the present invention may be configured to select the desired temperature of the beverage (e.g., based on user preference or predetermined heating or cooling temperature conditions). For example, the operating switch 500 may be configured to select the desired temperature of the beverage by the type of the beverage, or may be configured to include a level control function to select the degree to which the beverage is heated or cooled. Particularly, the controller 600 may be configured to adjust the temperature of the beverage by adjusting the amount of the electric current applied to the thermoelectric module 110 based on the desired temperature of the beverage.

For example, the controller 600 may be configured to adjust the amount of electrical power applied to the thermoelectric module 110 and in the heating mode, when the desired temperature of the beverage is higher, a greater amount of electrical power may be applied to the thermoelectric module 110. On the contrary, when the desired temperature of the beverage is lower, a smaller amount of electrical power may be applied to the thermoelectric module 110.

In addition, the cooling and heating apparatus for the vehicle cup holder of the present invention may further include a temperature sensor 240 configured to measure or sense the temperature of the heat dissipating member 210, and set a reference value to correspond to the amount of the electric current applied to the thermoelectric module 110. Accordingly, the controller 600 may be configured to compare a measured value measured by the temperature sensor 240 with the reference value estimated to correspond to the amount of the electric current. When the measured value exceeds the reference value, the controller 600 may be configured to restrict or block the amount of the electric current applied to the thermoelectric module 110. Thus, a user may prevent the temperature of the beverage from adjusting to be greater than or less than a desired temperature, thereby ensuring an appropriate temperature for the beverage, and further, the marketability of the cup holder 200 may be improved.

Additionally, when the operating switch 500 is turned off, or the controller 600 realizes an electrical open circuit with the thermoelectric module 110 after the controller 600 applies the electric current to the thermoelectric module 110 while realizing the electrical closed circuit with the thermoelectric module 110 with the operating switch 500 turned on, operation of the blower 230 may be stopped after the blower 230 is operated for a predetermined period of time.

For example, when a user removes the cup 100 from the cup holder 200 with the beverage disposed within the cup 100 heated, the flow of the electric current applied to the thermoelectric module 110 may be immediately interrupted, while the upper surface of the heat dissipating member 210 may remain heated. Accordingly, when the cup 100 is removed from the cup holder 200 after the beverage in the cup 100 is heated, the operation of the blower 230 may not be immediately stopped. Instead, after the blower 230 is operated for a few seconds to dozens of seconds, the operation of the blower 230 may be stopped, thereby rapidly cooling the heat dissipating member 210 and decreasing the danger that the user may be burned due to the high temperature of the beverage.

Furthermore, when the operating switch 500 is turned off, or the controller 600 realizes an electrical open circuit with the thermoelectric module 110 after the controller 600 applies the electric current to the thermoelectric module 110 while realizing the electrical closed circuit with the thermoelectric module 110 with the operating switch 500 turned on, the operation of the blower 230 may be stopped after the blower 230 is operated until the temperature of the heat dissipating member 210 reaches the reference temperature. In other words, since the temperature may be enteral from the temperature sensor 240 configured to measure the temperature of the heat dissipating member 210, the operation of the blower 230 may be stopped after the blower 230 is operated until the temperature of the heat dissipating member 210 reaches a temperature at which the risk of burning is eliminated. In addition, when the cup 100 is removed from the cup holder 200 both in the heating mode and in the cooling, the operation of the blower 230 may not be immediately stopped until after the blower 230 is operated by a predetermined logic, thereby reducing condensation that may occur on the heat dissipating member 210.

However, when the cup holder 200 enters the heating mode with the cup 100 mounted in the cup holder 200 and the controller 600 realizing the electrical closed circuit with the thermoelectric module 110 during an operation of the blower 230 with the operating switch 500 turned off, or with the controller 600 realizing the electrical open circuit with the thermoelectric module 110, the operation of the blower 230 may be immediately stopped. For example, when the beverage is desired to be heated with the cup holder 200 mounted in the cup holder 200 while the heat dissipating member 210 is cooled by the blower 230, the operation of the blower 230 may be immediately stopped, and the beverage may be reheated.

In addition, a lamp 400 may be connected to the controller 600 to control whether to operate the lamp 400 based on whether the cup holder 200 is operated in the cooling mode or the heating mode. In particular, the lamp 400, which may be a light emitting diode (LED), may be installed on the inner surface of the cup holder housing 200a. When the cup 100 is mounted in the cup holder 200, and the electrical closed circuits are realized between all components in the apparatus, in other words, when power is applied to all the components, the lamp 400 may be turned on to provide a notification regarding whether the cup holder 200 is operated in the cooling mode or the heating mode.

As described above, the cooling and heating apparatus for the vehicle cup holder of the present invention directly heats or cools the beverage of the cup 100 (e.g., instead of merely the cup holder) using the thermal energy transferred from the thermoelectric module 110, thereby rapidly heating or cooling the beverage. Particularly, when the cup holder 200 is operated in the heating mode, the danger that the cup holder 200 may be overheated may be eliminated, and thus the apparatus may safely heat a beverage to a higher temperature. Additionally, when the cup holder 200 is operated in the cooling mode, the amount of the thermal energy that may be wasted to the exterior may be minimized, and thus the apparatus has an improved performance for cooling a beverage.

When the cup holder 200 enters the cooling mode or the heating mode, and the controller 600 realizes an electrical closed circuit with the thermoelectric module 110, the controller 600 may be configured to adjust application of the electric current to the thermoelectric module 110, and further, prevent the second electroconductive part 220 disposed at a portion of the cup holder 200 from being grounded by other conductive materials except for the cup 100, thereby preventing safety accidents that may be caused during the cooling or heating operation of the cup holder 200.

Although exemplary embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. A cooling and heating apparatus for a vehicle cup holder, comprising:
   a cup having with a thermoelectric module and a first electroconductive part on an outer surface thereof, the first electroconductive part being in an electroconductive state with the thermoelectric module;
   a cup holder including a heat dissipating member and a second electroconductive part, the heat dissipating member and the second electroconductive part being disposed at respective portions and when a cup is mounted in the cup holder, the heat dissipating member corresponds to the thermoelectric module, and the second electroconductive part corresponds to the first electroconductive part; and
   a controller connected to the thermoelectric module to realize an electrical closed circuit, the controller configured to adjust an amount of an electric current applied to the thermoelectric module based on a desired temperature to heat or cool a beverage in the cup.

2. The cooling and heating apparatus of claim 1, wherein the thermoelectric module is disposed on a center of a lower surface of the cup, the first electroconductive part is disposed along a circumference of the thermoelectric module, the heat dissipating member is disposed on a lower surface of the cup holder, and the second electroconductive part is disposed along a circumference of the heat dissipating member.

3. The cooling and heating apparatus of claim 2, wherein the first electroconductive part is exposed to an exterior along the circumference of the thermoelectric module and the second electroconductive part is exposed to the exterior along the circumference of the heat dissipating member to be grounded by being in contact with the first electroconductive part.

4. The cooling and heating apparatus of claim 2, wherein the cup includes:
   an inner cup and an outer cup, the outer cup being combined with the inner cup and the outer cup surrounds a predetermined portion of the inner cup, with a space provided between the inner cup and the outer cup, wherein a first surface of the thermoelectric module is fixed to a lower surface of the inner cup and the first surface of the thermoelectric module is in contact with the lower surface of the inner cup, and wherein a second surface of the thermoelectric module is exposed to the exterior.

5. The cooling and heating apparatus of claim 3, further comprising:

a first elastic member configured to apply an elastic restoring force in a direction contrary to a direction in which the first electroconductive part moves toward the second electroconductive part when the first electroconductive part comes into contact with and presses the second electroconductive part.

6. The cooling and heating apparatus of claim 5, wherein the first elastic member is disposed between a lower surface of the second electroconductive part and an upper surface of the cup holder facing the lower surface of the second electroconductive part.

7. The cooling and heating apparatus of claim 6, wherein a magnetic body is disposed on the lower surface of the cup facing the second electroconductive part.

8. The cooling and heating apparatus of claim 5, wherein the first elastic member is disposed between an upper surface of the first electroconductive part and the lower surface of the cup facing the upper surface of the first electroconductive part.

9. The cooling and heating apparatus of claim 8, wherein a magnetic body is disposed on an upper surface of the cup holder facing the first electroconductive part.

10. The cooling and heating apparatus of claim 3, wherein an uppermost end of the heat dissipating member is disposed at a position higher than an uppermost end of the second electroconductive part, and a lowest end of the first electroconductive part is disposed at a position lower than a lower end of the thermoelectric module.

11. The cooling and heating apparatus of claim 1, further comprising:

a third electroconductive part disposed on the outer surface of the cup, the third electroconductive part being in an electroconductive state with the thermoelectric module; and a tongue assembly electrically connected to the controller and arranged at a portion that corresponds to the third electroconductive part when the cup is mounted in the cup holder and the tongue assembly realizes an electroconductive state between the controller and the third electroconductive part.

12. The cooling and heating apparatus of claim 11, wherein the third electroconductive part is disposed along an outer circumferential surface of the cup, wherein the tongue assembly includes:

a fourth electroconductive part, a first end of which is connected to the controller; and a second elastic member connected between an inner surface of the cup holder and the fourth electroconductive part, wherein the second elastic member is configured to apply an elastic force to the fourth electroconductive part to move a second end of the fourth electroconductive part toward a center of the cup holder.

13. The cooling and heating apparatus of claim 2, wherein the first electroconductive part is a wireless power receiver disposed along the circumference of the thermoelectric module, and the second electroconductive part is a wireless power transmitter disposed along the circumference of the heat dissipating member to wirelessly the second electroconductive part to the first electroconductive part.

14. The cooling and heating apparatus of claim 2, further comprising:

a blower disposed at a portion to which heat of the heat dissipating member is dissipated and the blower is configured to cool the heat dissipating member.

15. The cooling and heating apparatus of claim 14, wherein the controller includes:

an operating switch configured to determine whether to cool or heat the beverage, and wherein when the operating switch is turned on, the controller realizes the electrical closed circuit with the thermoelectric module, is configured to execute application of the electric current to the thermoelectric module, and adjust a flow direction of the electric current based on a cooling mode or a heating mode.

16. The cooling and heating apparatus of claim 14, wherein the controller includes:

an operating switch configured to determine whether to cool or heat the beverage, and when the operating switch is turned on, the controller realizes the electrical closed circuit with the thermoelectric module, and is configured to execute application of the electric current to the second electroconductive part; and a direction control circuit disposed between the first electroconductive part and the thermoelectric module, the direction control circuit configured to adjust the flow direction of the electric current based on the cooling mode or the heating mode.

17. The cooling and heating apparatus of claim 15, wherein when the cup holder enters the cooling mode with the cup mounted in the cup holder and the controller realizing the electrical closed circuit with the thermoelectric module, the controller is configured to apply a cooling operation signal to the thermoelectric module, to cool a first surface of the thermoelectric module adjacent to the inner surface of the cup and heat a second surface of the thermoelectric module, and apply an operation signal to the blower.

18. The cooling and heating apparatus of claim 15, wherein when the cup holder enters the heating mode with the cup mounted in the cup holder and the controller realizing the electrical closed circuit with the thermoelectric module, the controller is configured to apply a heating operation signal to the thermoelectric module, to heat a first surface of the thermoelectric module adjacent to the inner surface of the cup and cool a second surface of the thermoelectric module.

19. The cooling and heating apparatus of claim 15, wherein the operating switch is configured to select a desired temperature of the beverage, and the controller is configured to adjust the temperature of the beverage by adjusting the amount of the electric current applied to the thermoelectric module based on the desired temperature of the beverage.

20. The cooling and heating apparatus of claim 19, further comprising:

a temperature sensor configured to measure a temperature of the heat dissipating member, wherein the controller is configured to compare a measured value of the temperature sensor with a reference value estimated to correspond to the amount of the electric current applied to the thermoelectric module, and when the measured value exceeds the reference value, the controller is configured to restrict the amount of the electric current applied to the thermoelectric module.

21. The cooling and heating apparatus of claim 15, wherein when the operating switch is turned off, or the controller realizes an electrical open circuit with the thermoelectric module after the controller applies the electric current to the thermoelectric module while realizing the electrical closed circuit with the thermoelectric module with the operating switch turned on, an operation of the blower is stopped after the blower is operated for a predetermined period of time.

22. The cooling and heating apparatus of claim 20, wherein when the operating switch is turned off, or the controller realizes an electrical open circuit with the thermoelectric module after the controller applies the electric current to the thermoelectric module while realizing the electrical closed circuit with the thermoelectric module with the operating switch turned on, an operation of the blower is stopped after the blower is operated until the temperature of the heat dissipating member reaches the reference temperature.

23. The cooling and heating apparatus of claim 21, wherein when the cup holder enters the heating mode with the cup mounted in the cup holder and the controller realizing the electrical closed circuit with the thermoelectric module during an operation of the blower with the operating switch turned off, or with the controller realizing the electrical open circuit with the thermoelectric module, the operation of the blower is immediately stopped.

24. The cooling and heating apparatus of claim 1, further comprising:
   a lamp to the controller and the controller is configured to operate the lamp to be turned on based on whether the cup holder is being operated.

* * * * *